United States Patent
Prasad et al.

(10) Patent No.: US 10,268,572 B2
(45) Date of Patent: Apr. 23, 2019

(54) INTERACTIVE SOFTWARE PROGRAM REPAIR

(71) Applicant: FUJITSU LIMITED, Kawasaki-shi, Kanagawa (JP)

(72) Inventors: Mukul R. Prasad, San Jose, CA (US); Hiroaki Yoshida, Cupertino, CA (US); Ripon K. Saha, Santa Clara, CA (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/668,065

(22) Filed: Aug. 3, 2017

(65) Prior Publication Data
US 2019/0042398 A1 Feb. 7, 2019

(51) Int. Cl.
G06F 9/44 (2018.01)
G06F 11/36 (2006.01)

(52) U.S. Cl.
CPC ...... *G06F 11/3688* (2013.01); *G06F 11/3692* (2013.01)

(58) Field of Classification Search
CPC .................. G06F 11/3688; G06F 11/3692
USPC .......................................................... 717/124
See application file for complete search history.

(56) References Cited

U.S. PATENT DOCUMENTS

| | | | | |
|---|---|---|---|---|
| 6,173,440 B1 * | 1/2001 | Darty | .......... | G06F 11/3608 714/35 |
| 6,574,764 B2 * | 6/2003 | Krech, Jr. | .......... | G11C 29/56 365/230.03 |
| 7,386,434 B1 * | 6/2008 | Cischke | .......... | G01R 31/318357 703/14 |
| 2005/0193269 A1 * | 9/2005 | Haswell | .......... | G06F 11/3684 714/38.13 |
| 2006/0010426 A1 * | 1/2006 | Lewis | .......... | G06F 11/3684 717/124 |
| 2007/0006150 A9 * | 1/2007 | Walmsley | .......... | B41J 2/04505 717/120 |
| 2007/0124456 A1 * | 5/2007 | Jagadeesan | .......... | G06Q 50/32 709/224 |

(Continued)

OTHER PUBLICATIONS

Weimer et al. (May 2009). "Automatically Finding Patches Using Genetic Programming" . ICSE'09.

(Continued)

*Primary Examiner* — Chameli Das
(74) *Attorney, Agent, or Firm* — Maschoff Brennan

(57) ABSTRACT

In some examples, a method to interactively repair a software program using one or more automatically generated tests with human-provided test oracles may include identifying a fault location in a software program, generating a potential repair at the fault location based on a repair candidate, automatically generating a first test to test the potential repair, and generating a first query for a first test oracle based on the first test. The method may also include obtaining a response to the first query from a human, generating a first human-provided test oracle based on the first query and the obtained response to the first query, augmenting a test suite to include the first automatically generated test with the first human-provided test oracle, and testing the potential repair using the augmented test suite including the first automatically generated test with the first human-provided test oracle.

17 Claims, 5 Drawing Sheets

(56) References Cited

U.S. PATENT DOCUMENTS

| | | | | |
|---|---|---|---|---|
| 2009/0292941 | A1* | 11/2009 | Ganai | G06F 11/3636 714/2 |
| 2010/0100871 | A1* | 4/2010 | Celeskey | G06F 11/008 717/124 |
| 2012/0054553 | A1* | 3/2012 | Artzi | G06F 11/3688 714/38.1 |
| 2012/0185731 | A1* | 7/2012 | Barman | G06F 11/3604 714/38.1 |
| 2014/0317601 | A1* | 10/2014 | Patwardhan | G06F 11/3672 717/124 |
| 2016/0321594 | A1* | 11/2016 | Linde | G06Q 10/06395 |
| 2017/0060735 | A1 | 3/2017 | Yoshida et al. | |
| 2017/0161182 | A1 | 6/2017 | Yoshida et al. | |
| 2017/0220972 | A1* | 8/2017 | Conway | G06Q 10/10 |
| 2017/0242782 | A1* | 8/2017 | Yoshida | G06F 11/3692 |
| 2018/0089065 | A1* | 3/2018 | Yoshida | G06F 11/3664 |

OTHER PUBLICATIONS

Le Goues et al. (Jun. 2012). "A Systematic Study of Automated Program Repair: Fixing 55 out of 105 Bugs for $8 Each". ICSE'12.

Nguyen et al. (May 2013). "Boa: A Language and Infrastructure for Analyzing Ultra-Large-Scale Software Repositories". ICSE'13.

Kim et al. (May 2013). "Automatically Generated Patches as Debugging Aids: A Human Study". ICSE'13.

DeMarco et al. (May 2014). "Automatic Repair of Buggy If Conditions and Missing Preconditions with SMT". CSTVA'14.

Kaleeswaran, et al. (Jun. 2014). "MintHint: Automated Synthesis of Repair Hints". ICSE'14.

Tan et al. (May 2015). "Relifix: Automated Repair of Software Regressions". ICSE'15.

Mechtaev et al. (May 2015). "DirectFix: Looking for Simple Program Repairs". ICSE'15.

Long et al. (Jul. 2015). "An Analysis of Patch Plausibility and Correctness for Generate- and-Validate Patch Generation Systems". ISSTA'15.

Long et al. (Sep. 2015). "Staged Program Repair with Condition Synthesis". FSE'15.

Long et al. (Jan. 2016). "Prophet: Automatic Patch Generation via Learning from Successful Patches." POPL'16.

U.S. Appl. No. 15/051,503, filed Feb. 23, 2016.

U.S. Appl. No. 15/374,776, filed Dec. 9, 2016.

U.S. Appl. No. 15/436,595, filed Feb. 17, 2017.

U.S. Appl. No. 15/276,628, filed Sep. 26, 2016.

Li et al. (Jul. 2011). "KLOVER: A Symbolic Execution and Automatic Test Generation Tool for C++ Programs". CAV'11.

* cited by examiner

US 10,268,572 B2

INTERACTIVE SOFTWARE PROGRAM REPAIR

FIELD

The present disclosure relates generally to software program repair.

BACKGROUND

Software programs often have faults in them (commonly referred to as "bugs") in which they may not operate as intended. Often automated repair systems are used in an attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, methods to interactively repair a software program using one or more human-generated test oracles, added to one or more automatically generated tests, are described. An example method to interactively repair a software program using one or more human-generated test oracles, added to one or more automatically generated tests, may include identifying a fault location in a software program, generating a potential repair at the fault location based on a repair candidate, automatically generating a first test to test the potential repair, and generating a first query for a first test oracle based on the first test. The method may also include obtaining a response to the first query from a human, generating a first human-provided test oracle based on the first query and the obtained response to the first query, adding the first human-provided test oracle to the first test to generate an augmented first test; augmenting a test suite to include the augmented first test, and testing the potential repair using the augmented test suite including the augmented first test.

The objects and advantages of the embodiments will be realized and achieved at least by the elements, features, and combinations particularly pointed out in the claims. Both the foregoing general description and the following detailed description are given as examples, are explanatory and are not restrictive of the invention, as claimed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DESCRIPTION OF EMBODIMENTS

Figure 1:
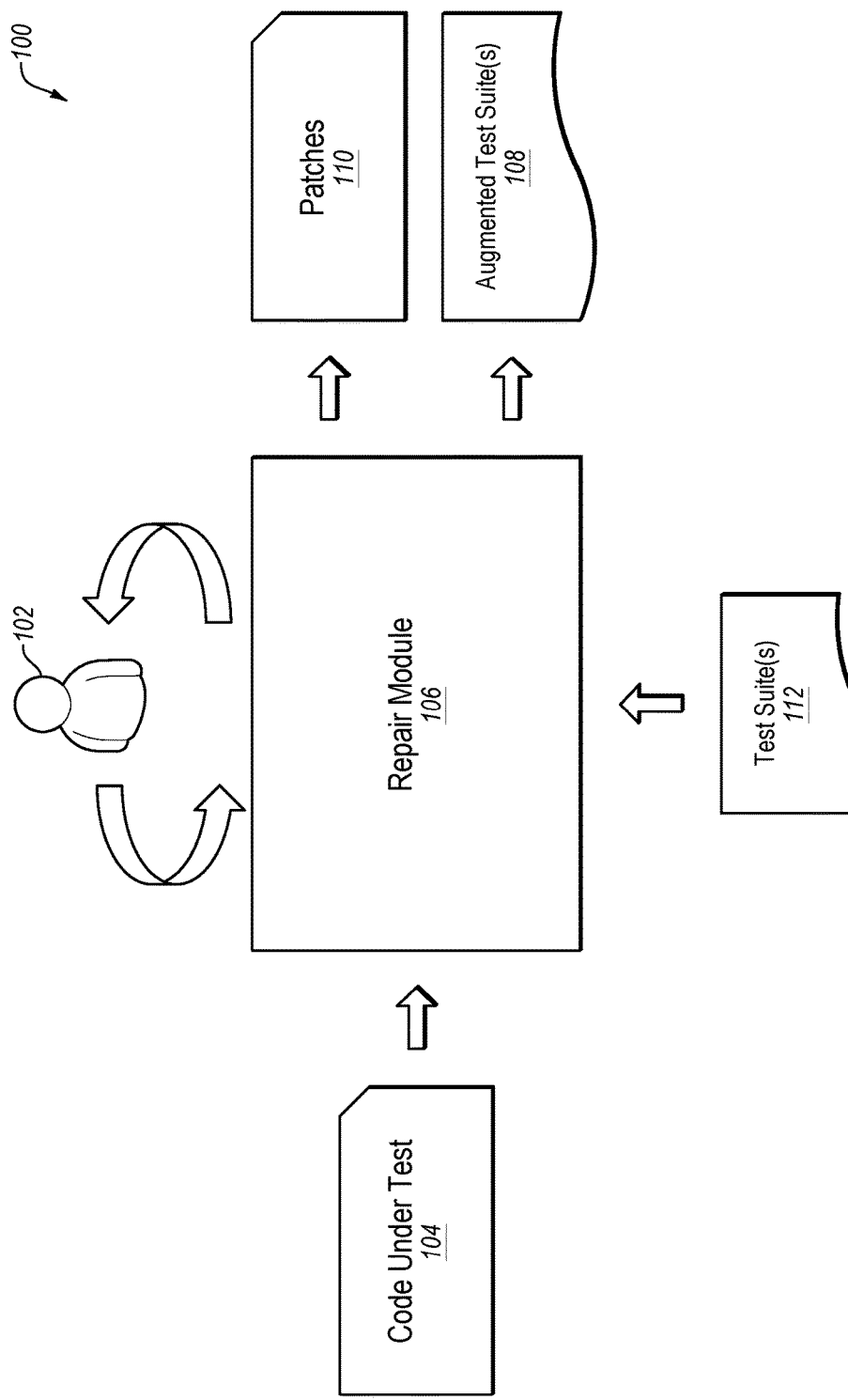
FIG. 1 illustrates an overview of an example environment related to interactive software program repair.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

The present disclosure is generally drawn, inter alia, to methods, apparatus, systems, devices, and/or computer program products related to interactive software program repair. Software programs often include faults (also commonly referred to as "bugs") that may cause the software programs to behave in an unintended manner. Additionally, automated repair systems and techniques (e.g., automated program repair) are often used to detect and correct faults to repair software programs. An objective of automated program repair is to automate the process of identifying and fixing (e.g., patching) the bugs that have been identified in a software program. This may be done on the basis of a repair specification, which may serve as a golden reference for the expected behavior of the corrected or patched software program. For example, the repair specification may include a suite of test cases (e.g., test suite), one or more of which may be failing under the current buggy version of the software program under repair (e.g., software program under test).

However, the test suites may be incomplete as a repair specification. Moreover, commonly used automated repair systems and techniques may be using the repair specification simply to check if the original or repaired software program passes or fails a given test case. Thus, commonly used automated repair systems and techniques may produce repairs that satisfy the repair specification (e.g., produce repairs that satisfy the test cases in the repair specification) but are in fact incorrect because the test suite may be incomplete.

In some embodiments, a repair module incorporates human-provided test oracles in the generation of augmented test cases and generation of an augmented test suite suitable to improve repairs (patches) for bugs in a software program. The repair module may identify one or more faults and corresponding fault locations in a software program based on the execution of an initial test suite (e.g., an existing test suite). The initial test suite may include a suite of tests. For each fault location, the repair module may select a repair candidate and make a potential repair or transformation (e.g., a potential patch) at the fault location using the repair candidate. The repair module may then execute the software program with the potential repair at the fault location (e.g., the potential patch) against the test suite to determine whether the potential repair passes the test suite (e.g., the tests included in the test suite). If the potential repair does not pass the test suite, the repair module may discard the potential repair, select another repair candidate, make a new potential repair at the fault location using the newly selected repair candidate, and test the new potential repair using the test suite.

If the potential repair passes the test suite, the repair module may determine whether there is a new (e.g., an additional) test suitable to test the potential repair. If there are no further tests suitable to test the potential repair, the repair module may accept the potential repair at the fault location as a proper repair (a patch) of the fault. If there is a new test, the repair module may include the new test in the test suite. In some instances, the repair module may generate the new test. The repair module may derive or generate a query for a test oracle based on the new test (e.g., a query that corresponds to the execution of the new test), and present the query for the test oracle to a human having knowledge of software programming, such as a programmer, software developer, and the like. The repair module may generate a human-provided test oracle based on the presented query and the response of (e.g., by) the human to the presented query, and add the human-provided test oracle to the new test. In this manner, the new test may be augmented such that an existing test suite (e.g., the initial test suite) may be augmented with the new test and its human-provided test oracle to create an augmented test suite. The augmented test suite may then become (be considered) the existing test suite. The repair module may then test the potential repair using the augmented test suite. If the potential repair passes the augmented test suite, the repair module may determine whether there are additional new tests suitable to further test the potential repair. If there is another new test, the repair module may iterate the above-described process to augment the existing test suite with the new test augmented with a corresponding human-provided test oracle. In this manner, the repair module may strengthen the test suite with one or more tests and their human-provided test oracles to prune or discard incorrect potential repairs. In some embodiments, the repair module may accept the potential repair as a proper repair upon the potential repair passing the augmented test suite without checking for additional tests to further test the potential repair.

If the potential repair does not pass the augmented test suite, the repair module may reject the potential repair as an improper repair. That is, the repair candidate may be discarded as generating an improper repair. The repair module may select a new repair candidate, make a new potential repair at the fault location using the new repair candidate, and test the new potential repair using the test suite. In similar fashion, the repair module may process one or more of the repair candidates at one or more of the identified fault locations.

In some embodiments, the repair module may generate additional or multiple proper repairs (e.g., multiple patches) for a fault. That is, the repair module may accept more than one potential repair at a fault location as a proper repair (patch) of a fault. For example, after accepting a potential repair at a fault location based on a repair candidate as a proper repair at the fault location, the repair module may determine whether there are additional repair candidates for the fault location, and iterate the above-described process of generating potential repairs based on the additional repair candidates, and testing the potential repairs against the augmented test suite to potentially accept additional potential repairs at the fault location.

In some embodiments, the repair module may test previously accepted potential repairs (previous proper repairs) against the augmented test suite (e.g., the test suite augmented with new test cases augmented with corresponding human-proved test oracles) to prune previously accepted potential repairs (e.g., to determine whether the previous proper repairs are still proper repairs). That is, the repair module may determine whether the previous proper repairs pass the augmented test suite. For example, a previously accepted potential repair may have been tested using a prior test suite that did not include one or more tests (e.g., one or more newly generated tests augmented with human-provided test oracles) that are now included in the augmented test suite, and accepted as a proper repair. The repair module may test the previously accepted potential repair using the augmented test suite and, if the previously accepted potential repair does not pass the augmented test suite, the repair module may discard the previously accepted potential repair as an improper repair. That is, the previously determined proper repair may no longer be deemed a proper repair. If the previously accepted potential repair passes the augmented test suite, the repair module may again accept the previously accepted potential repair as a proper repair. That is, the previously determined proper repair may remain deemed as a proper repair that has been tested against the augmented test suite.

Various embodiments of the present disclosure are described in detail with reference to the accompanying drawings.

FIG. 1 illustrates an overview of an example environment 100 related to interactive software program repair, arranged in accordance with at least some embodiments described herein. Environment 100 may include a human 102 that interacts with a repair module 106 to generate one or more human-provided test oracles. Human 102 may be any person with sufficient knowledge of software programming, such as a programmer, software developer, and the like. Repair module 106 may be configured to analyze a code under test 104 for one or more faults using test suites 112. Repair module 106 may also be configured to output or generate augmented test suites 108 that include one or more augmented tests that have human-provided test oracles added thereto, resulting from testing potential repairs to faults in code under test 104. In some embodiments, repair module 106 may be configured to output or generate one or more patches 110 that correctly repair a fault.

Code under test 104 may include electronic data, such as, for example, a software program, code of the software program, libraries, applications, scripts, or other logic or instructions for execution by a processing device. In some embodiments, code under test 104 may include a complete instance of the software program. Additionally or alternatively, code under test 104 may include a portion of the software program. Code under test 104 may be written in any suitable type of computer language that may be used for the software program.

Repair module 106 may include code and routines configured to enable a computing device to perform one or more potential repairs to the faults in code under test 104 and interact with human 102 to generate augmented test suites 108 that include one or more augmented new tests that each include a human-provided test oracle added thereto. Additionally or alternatively, repair module 106 may include code and routines configured to enable a computing device to test the potential repairs to the faults in code under test 104 using augmented test suites 108 to generate patches 110. In some embodiments, repair module 106 may be implemented using hardware including a processor, a microprocessor (e.g., to perform or control performance of one or more operations), a field-programmable gate array (FPGA), or an application-specific integrated circuit (ASIC). In some other instances, repair module 106 may be implemented using a combination of hardware and software. In the present disclosure, operations described as being performed by repair module 106 may include operations that the repair module 106 may direct a corresponding system to perform.

Test suites 112 may include one or more tests (e.g., routines, functions, and the like) that may act as test cases for code under test 104. Test suites 112 may be configured to determine whether code under test 104 behaves in a specified manner. Test suites 112 may be configured according to any suitable technique.

Repair module 106 may be configured to apply one or more tests of test suites 112 with respect to code under test 104 to detect or determine one or more faults and corresponding fault locations in code under test 104. In some embodiments, repair module 106 may be configured to execute one or more tests included in test suites 112, which may be referred to as performing a test execution. A test execution that passes may be referred to as a "passing test execution" and a test execution that fails may be referred to as a "failing test execution." In some embodiments, a fault and corresponding fault location of code under test 104 may be identified based on analyzing one or more failing test executions and one or more passing test executions. A fault location may be a location in code under test 104 where a modification or a transformation of code under test 104 may be made to attempt to repair the corresponding fault.

In some embodiments, repair module 106 may be configured to prioritize the identified faults and/or fault locations in code under test 104. Repair module 106 may then select a particular fault location based on the priority of the particular fault location. The prioritization may be used to determine the order of selection of fault locations during performance of potential repair operations. A fault location with a higher priority may be selected prior to the selection of a fault location with a lower priority. For example, repair module 106 may compare the priorities of each of the different fault locations. A particular fault location may have a higher priority than each of the other fault locations. Based on the comparison of the priorities, repair module 106 may select a particular fault location that has a higher priority instead of selecting a fault location that has a lower priority.

In some embodiments, repair module 106 may be configured to perform one or more of the potential repair operations based on a repair template. The repair template may include any suitable type of instructions or routines that, when executed, may be configured to implement one or more modifications of or transformations at fault locations with respect to code under test 104 in response to the presence of faults in code under test 104. The modifications may include changes in code under test 104 at the fault locations that may repair or attempt to repair the faults.

In some embodiments, repair module 106 may be configured to select a fault location in code under test 104, and perform a potential repair operation at the selected fault location. The fault location may be selected based on the prioritization of the fault locations. The potential repair operation may be based on a repair candidate that may be associated with the selected fault in code under test 104. The potential repair operation may include implementing the repair candidate at the selected fault location as a potential repair (potential patch). Repair module 106 may be configured to test the potential repair at the fault location using one or more tests of test suites 112. Repair module 106 may discard the potential repair as an improper repair of the fault if the potential repair does not pass the applied tests of test suites 112. Repair module 106 may be configured to attempt to generate one or more new test cases and augment them with human-provided test oracles to further test the potential repair if the potential repair passes the applied tests of test suites 112. Repair module 106 may test the potential repair using the new automatically generated test-cases augmented with their human-provided test oracles. Repair module 106 may discard the potential repair as an improper repair of the fault if the potential repair does not pass the augmented newly generated tests, and accept the potential repair as a proper repair (e.g., patch) of the fault if the potential repair passes the augmented newly generated tests.

In some embodiments, repair module 106 may be configured to create and augment one or more new or additional tests (e.g., one or more tests in addition to the tests in test suites 112) to test potential repairs to faults in code under test 104 that pass the tests of test suites 112 as follows. Repair module 106 may create a new test using any suitable technique. In some embodiments, the test (e.g., new test) may be a unit test. Having created a new test, repair module 106 may generate a query for a test oracle based on the new test. Repair module 106 may then present the query for the test oracle to human 102. Human 102 may respond or reply to the presented query for the test oracle. For example, the query for the test oracle may be presented, and response received, using any suitable technique such as visual, audio, and/or the like. Repair module 106 may generate a human-provided test oracle based on the presented query for the test oracle and the response of human 102 to the presented query. Repair module 106 may include (e.g., add) the human-provided test oracle with the appropriate test to generate an augmented test and add that augmented test to test suites 112 to generate augmented test suites 108.

For example, suppose the identified fault is in code under test 104, and happens to be a function, "int median(int n1, int n2, int n3)", that returns a median of three integers. Repair module 106 may create a new test, "median(1, 2, 3)," to test a potential repair of a fault location corresponding to the fault in code under test 104. For the new test, repair module 106 may generate a query, "What is the median in the sequence of three integers 1, 2, and 3?" Repair module 106 may then present the query to human 102. Human 102 may provide a response to the presented query by indicating or specifying that "2" is the median. Based on the response of human 102 to the presented query, repair module 106 may generate a human-provided test oracle, for example, "assert median(1, 2, 3)==2." This test-oracle may then be added to the new test, which invokes the function median with inputs 1, 2, 3 (as median(1, 2, 3)) and checks the returned response using the oracle as in "assert median(1, 2, 3)==2".

In some embodiments, repair module 106 may be configured to generate a hypothesis for a test oracle based on the new test. The hypothesis may be a proposition as to the result of the new test. In the example above, for the new test "median(1, 2, 3)," repair module 106 may generate a hypothesis, "Is 2 the median in the sequence of three integers 1, 2, and 3?" Repair module 106 may then present the hypothesis to human 102. Human 102 may provide a response to the presented hypothesis by providing an acknowledgement (e.g., "yes"). Based on the response of human 102 to the presented hypothesis, repair module 106 may generate a human-provided test oracle, for example, "assert median(1, 2, 3)==2," which may be added to the new test to augment the new test. In these or other embodiments, the augmented new test may be added to test suite 112 to generate augmented test suite 108.

In some embodiments, repair module 106 may test a potential repair at the fault location using augmented test suite 108 that includes the augmented new test with the human-provided test oracle. Repair module 106 may be configured to accept the potential repair as a proper repair in response to the potential repair passing augmented test suite 108. In some embodiments, repair module 106 may be configured to attempt to generate multiple augmented new tests with human-provided test oracles to test a potential repair to a fault in code under test 102. For example, subsequent to testing a potential repair using a first augmented new test with a first human-provided test oracle, repair module 106 may attempt to create a second new test to test the potential repair. If repair module 106 is able to create a second new test, repair module 106 may generate a second human-provided test oracle based on the second new test, and add the second human-provided test oracle to the second new test to generate an augmented second new test. The repair module 106 may be configured to add the augmented second new test to the augmented test suite 108. Repair module 106 may then test the potential repair using augmented test suite 108 that includes the augmented second new test with the second human-provided test oracle.

Having processed the selected fault location and perhaps not found an acceptable repair for the fault, repair module 106 may be configured to select a new fault location in code under test 104, and perform a potential repair operation at the newly selected fault location. The new fault location may be selected based on the prioritization of the fault locations. For example, the new fault location may be the fault location having the highest priority of the remaining fault locations in code under test 102. The potential repair operation may be based on a repair candidate that may be associated with the newly selected fault location in code under test 104. The potential repair operation may include implementing the repair candidate at the newly selected fault location as a potential repair (potential patch). Repair module 106 may then process the newly selected fault location in a similar manner as described herein.

In some embodiments, repair module 106 may be configured to generate multiple patches for a fault. That is, the repair module may accept more than one potential repair at a fault location as a proper repair (patch) of a fault. After accepting a potential repair at a fault location based on a repair candidate as a proper repair at the fault location, repair module 106 may be configured to determine whether there are additional repair candidates for the fault location. If there is an additional repair candidate, repair module 106 may be configured to iterate the above-described process of generating a potential repair at the fault location based on the additional repair candidate, and testing the potential repair against the augmented test suite to potentially accept multiple potential repairs at the fault location as multiple patches of the fault. Repair module 106 may be configured to process any additional repair candidates (e.g., third, fourth, etc.) for the fault location.

In some embodiments, repair module 106 may be configured to include the one or more patches for a fault in patches 110. In some embodiments, repair module 106 may be configured to include one or more patches for one or more additional faults in patches 110. That is, patches 110 may include one or more patches for multiple faults in code under test 102.

In some embodiments, repair module 106 may be configured to test previously accepted repairs (previously accepted potential repairs) against augmented test suites 108 to prune previously accepted repairs. Repair module 106 may test a proper repair that has not been tested against augmented test suites 106 against augmented test suites 108 to determine whether the proper repair passes augmented test suite 108. If the proper repair does not pass augmented test suites 108, repair module 106 may reject the proper repair as being an improper repair. If the proper repair passes augmented test suites 108, repair module 106 may again accept the proper repair as a proper repair.

In some embodiments, repair module 106 may be configured to output a modified code under test that includes modifications (e.g., transformations) to code under test 102 to correct one or more faults in code under test 102.

Modifications, additions, or omissions may be made to FIG. 1 without departing from the scope of the present disclosure. For example, environment 100 may include more or fewer elements than those illustrated and described in the present disclosure. In addition, in some embodiments, one or more routines, one or more instructions, or at least a portion of code of repair module 106 and test suites 112 may be combined such that they may be considered the same element or may have common sections that may be considered part of two or more of repair module 106 and test suites 112. For example, augmented test suites 108 may include a different number of human-provided test oracles to test a fault or multiple faults. In another example, patches 110 may include any number of patches (proper repairs) to a fault or multiple faults]

Figure 2:
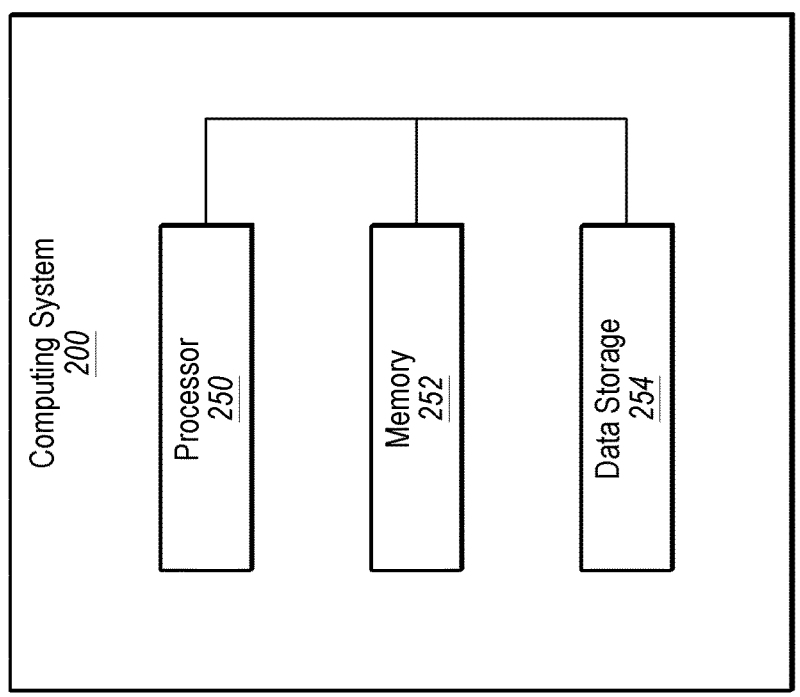
FIG. 2 illustrates selected components of an example general purpose computing system that may be configured to repair a software program.

FIG. 2 illustrates selected components of an example general purpose computing system 202 that may be configured to repair a software program, arranged in accordance with at least some embodiments described herein. Computing system 202 may be configured to implement or direct one or more operations associated with a repair module (e.g., repair module 106 of FIG. 1). Computing system 202 may include a processor 250, a memory 252, and a data storage 254. Processor 250, memory 252, and data storage 254 may be communicatively coupled.

In general, processor 250 may include any suitable special-purpose or general-purpose computer, computing entity, or computing or processing device including various computer hardware or software modules and may be configured to execute instructions stored on any applicable computer-readable storage media. For example, processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, processor 250 may include any number of processors configured to, individually or collectively, perform or direct performance of any number of operations described in the present disclosure. Additionally, one or more of the processors may be present on one or more different electronic devices, such as different servers.

In some embodiments, processor 250 may be configured to interpret and/or execute program instructions and/or process data stored in memory 252, data storage 254, or memory 252 and data storage 254. In some embodiments, processor 250 may fetch program instructions from data storage 254 and load the program instructions in memory 252. After the program instructions are loaded into memory 252, processor 250 may execute the program instructions.

For example, in some embodiments, the repair module may be included in data storage 254 as program instructions.

Processor 250 may fetch the program instructions of the repair module from data storage 254 and may load the program instructions of the repair module in memory 252. After the program instructions of the repair module are loaded into memory 252, processor 250 may execute the program instructions such that the computing system may implement the operations associated with the repair module as directed by the instructions.

Memory 252 and data storage 254 may include computer-readable storage media for carrying or having computer-executable instructions or data structures stored thereon. Such computer-readable storage media may include any available media that may be accessed by a general-purpose or special-purpose computer, such as processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 250 to perform a certain operation or group of operations.

Modifications, additions, or omissions may be made to computing system 202 without departing from the scope of the present disclosure. For example, in some embodiments, computing system 202 may include any number of other components that may not be explicitly illustrated or described.

Figure 3A:
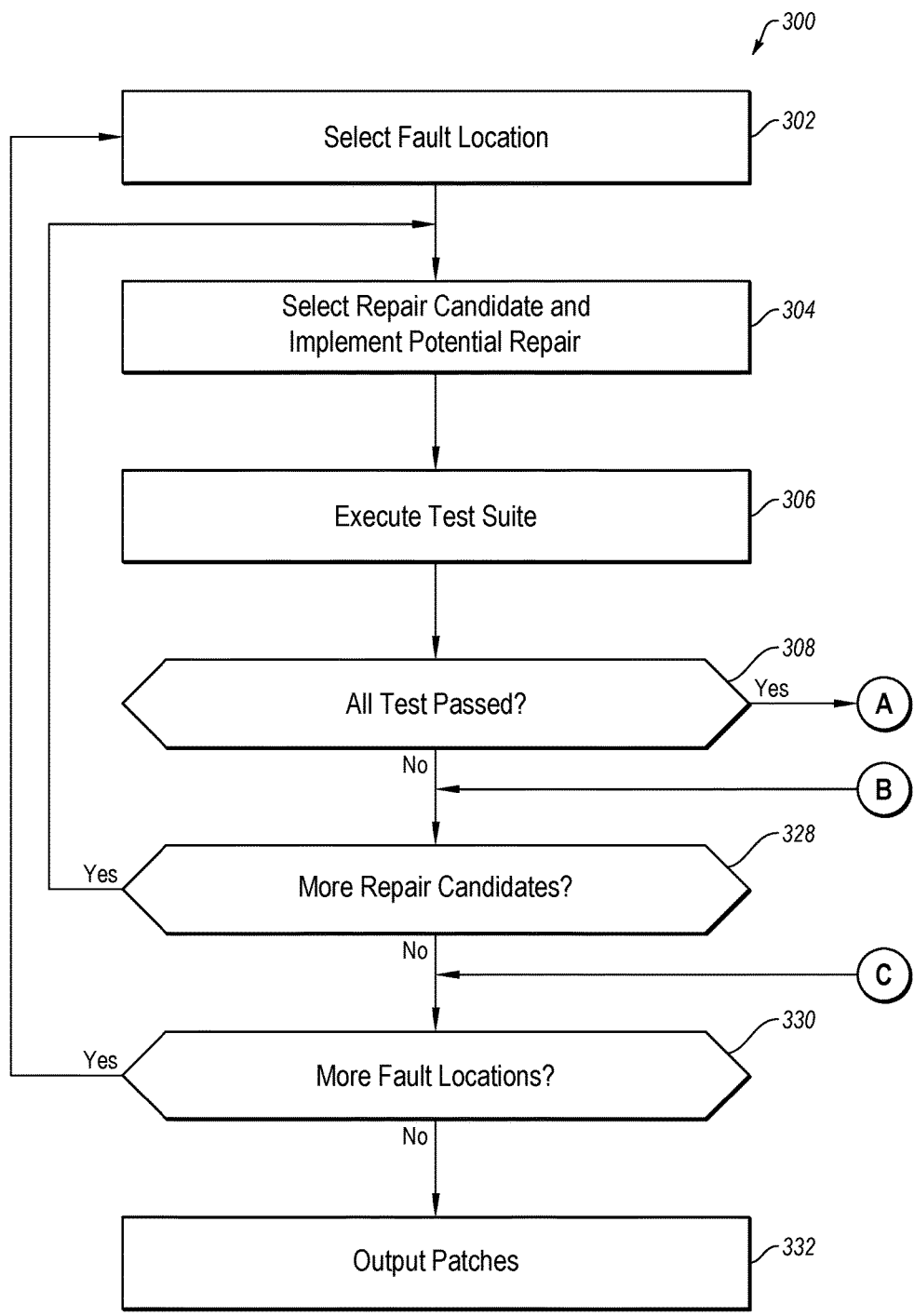
FIGS. 3A and 3B is a flow diagram that illustrates an example process to interactively repair a software program.
Figure 3B:
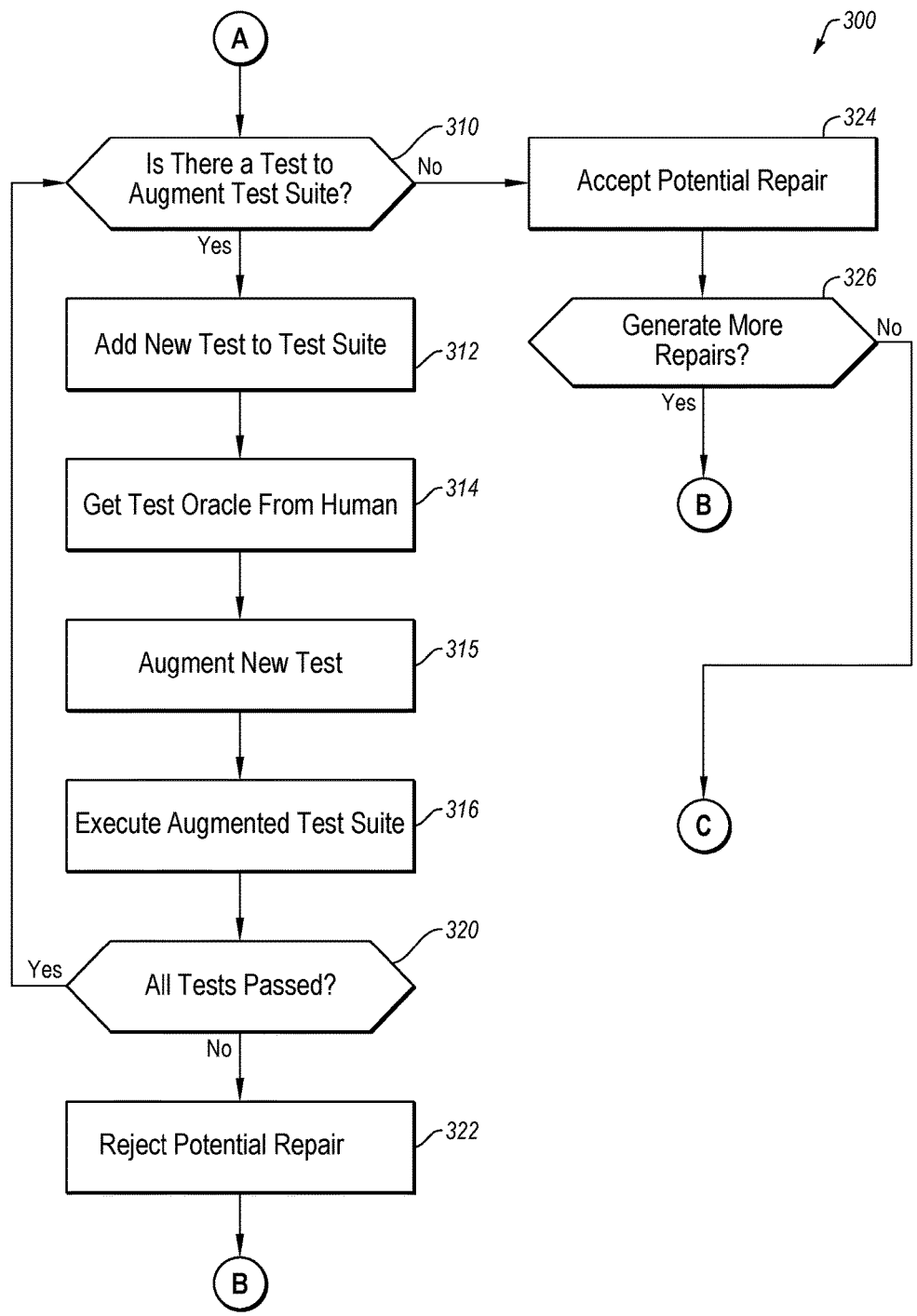

FIGS. 3A and 3B is a flow diagram 300 that illustrates an example process to interactively repair a software program, arranged in accordance with at least some embodiments described herein. Example processes and methods may include one or more operations, functions or actions as illustrated by one or more of blocks 302, 304, 306, 308, 310, 312, 314, 316, 318, 320, 322, 324, 326, 328, 330, and/or 332. The operations described in blocks 302-332 may be performed by any suitable system, apparatus, or device with respect to a software program (e.g., code under test 104 of FIG. 1). For example, in some embodiments, the operations described in blocks 302-332 may be performed by repair module 106 of FIG. 1 or a computing system such as computing system 202 of FIG. 2 (e.g., as directed by a repair module). The operations described in blocks 302-332 may also be stored as computer-executable instructions in a computer-readable medium such as memory 252 and/or data storage 254 of computing system 202.

As depicted by flow diagram 300, the example process to interactively repair a software program may begin with block 302 ("Select Fault Location"), where a repair module (e.g., repair module 106 of FIG. 1) may select a fault location in a software program that is being repaired (e.g., code under test 104 of FIG. 1). One or more faults and corresponding fault locations may have been identified in the software program using any suitable technique. For example, in some embodiments, the fault identification may have resulted from a test execution of one or more test suites (e.g., test suites 112 of FIG. 1) with respect to the software program.

In some embodiments, the repair module may select a particular fault location based on the priorities of the identified faults and/or corresponding fault locations. The priorities may determine the order of selection of a particular fault location for implementation of a repair candidate during the performance of the interactive repair of the software program. For example, the repair module may compare the priorities of each of the identified fault locations. A particular fault location may have a higher priority than each of the other fault locations. Based on the comparison of the priorities, the repair module may select the particular fault location that has a higher priority instead of selecting a fault location that has a lower priority. The repair module may implement a repair candidate at the selected fault location as a potential repair.

Block 302 may be followed by block 304 ("Select Repair Candidate and Implement Potential Repair"), where the repair module may select a repair candidate and implement a potential repair using the selected repair candidate. The repair module may implement the repair candidate at the selected fault location as a potential repair of the fault corresponding to the fault location. In some embodiments, the repair module may implement the repair candidate based on a repair template as described herein.

Block 304 may be followed by block 306 ("Execute Test Suite"), where the repair module may execute one or more tests of a test suite (e.g., test suites 112 of FIG. 1) with respect to the potential repair at the fault location. Testing the potential repair may include testing some or all of the software program including the potential repair. Testing the potential repair and/or some or all of the software program including the potential repair may generate information regarding the tested software program and/or the potential repair, such as whether the tested software program and/or the potential repair passes the tests of the test suite.

Block 306 may be followed by decision block 308 ("All Tests Passed?"), where the repair module may determine whether the potential repair at the selected fault location passes the tests of the test suite. For example, the repair module may examine each of the tests that were executed against the potential repair to determine whether the potential repair passes the test suite. If the potential repair at the selected fault location passes all the tests of the test suite, decision block 308 may be followed by decision block 310 ("Is there a Test to Augment Test Suite?"), where the repair module may determine whether there is an additional (e.g., a new) test to augment the test suite. That is, the repair module may determine whether there is an additional test to test the potential repair at the fault location.

In some embodiments, the repair module may be configured to create an additional test using any suitable technique. For example, the repair module may create the additional test using symbolic execution based test generation, search-based test generation techniques or some combination of these techniques In some embodiments, the repair module may be configured to create additional tests so long as all execution paths in the software program that is being repaired and/or the potential repair are not exercised. That is, the repair module may be configured to cease creating additional tests once all the execution paths in the software program that is being repaired and/or the potential repair have been exercised. In some embodiments, the repair module may be configured to create additional tests so long as a specific percentage of the execution paths in the software program that is being repaired and/or the potential repair are not exercised. That is, the repair module may be configured to stop creating additional tests once a specific percentage (e.g., 95%, 90%, 85%, 80%, and the like) of the execution paths in the software program that is being repaired and/or the potential repair have been exercised. In some embodiments, the repair module may be configured to create additional tests until the number of tests reach a specific number. In some embodiments, the repair module may be configured to create additional tests until the repair module is unable to create new tests.

If there is an additional (e.g., a new) test to augment the test suite, decision block 310 may be followed by block 312 ("Add New Test to Test Suite"), where the repair module may create the additional test and add the additional test to the test suite. For example, the test suite may be the test suite (e.g., test suites 112 of FIG. 1) used to test the potential repair at the fault location at block 306. In some embodiments, the test suite may be a test suite previously augmented with test cases augmented with human-provided test oracles (e.g., augmented test suites 108 of FIG. 1).

Block 312 may be followed by block 314 ("Get Test Oracle from Human"), where the repair module may obtain a test oracle from a human (e.g., human 102 of FIG. 1) for the newly created test case. In some embodiments, the repair module may generate a query for a test oracle based on the additional test. For example, the query may ask for a result of the execution of the additional test. The repair module may present the query to the human, and obtain a response of the human to the presented query. The repair module may then generate a human-provided test oracle based on the presented query and the corresponding response of the human. In some embodiments, the repair module may be configured to skip a presented query in the instance the human does not or cannot respond (e.g., answer) the presented query. For example, the repair module may wait up to a specific amount of time (e.g., 30 seconds, 1 minute, etc.) to receive a response to the presented query. In some embodiments, the repair module may be configured to continue generating additional tests and presenting queries corresponding to the generated additional tests if the human does not or cannot respond to the presented query. In some embodiments, the repair module may be configured to generate and present a different (e.g., another) query in the same input space as the presented query if the human does not or cannot respond to the presented query. In some embodiments, the repair module may be configured to skip the fault location (e.g., current fault location) and process a next (e.g., another) fault location if the human does not or cannot respond to the presented query.

At block 315, ("Augment New Test"), the repair module may augment the new test by adding the human-provided test oracle to the new test. The repair module may then augment the test suite by including the augmented new test in the test suite. Block 315 may be followed by block 316 ("Execute Augmented Test Suite"), where the repair module may execute the augmented test suite including the additional test augmented with the human-provided test oracle with respect to the potential repair at the fault location. In some embodiments, the repair module may test the potential repair at the fault location against the newly generated augmented test. In some embodiments, the repair module may test the potential repair at the fault location against some or all of the test of the augmented test suite, including the augmented newly generated test that is augmented with the human-provided test oracle. The tested tests may include one or more previously generated tests augmented with human-provided test oracles. Testing the potential repair may include testing some or all of the software program including the potential repair. Testing the potential repair and/or some or all of the software program including the potential repair may generate information regarding the tested software program and/or the potential repair, such as whether the tested software program and/or the potential repair passes the tests of the augmented test suite.

Block 316 may be followed by decision block 320 ("All Tests Passed?"), where the repair module may determine whether the potential repair at the selected fault location passes the tests of the augmented test suite. For example, the repair module may determine whether the potential repair at the selected fault location passes the augmented newly generated test. For example, the repair module may examine each of the tests that were executed against the potential repair to determine whether the potential repair at the selected fault location passes the augmented test suite. If the potential repair at the selected fault location passes the tests of the augmented test suite (including the augmented newly generated test), decision block 320 may be followed by decision block 310, where the repair module may determine whether there is another additional (e.g., another new) test to augment with another human-provided test oracle that may be added to the augmented test suite to further augment the augmented test suite. That is, the repair module may determine whether there is another test that may be the basis for a human-provided test oracle and that may be augmented with the corresponding human-provided test oracle to further test the potential repair at the fault location. In this instance, the repair module may be enriching or strengthening the augmented test suite with additional augmented tests and that are augmented with corresponding human-provided test oracles. The additional augmented test (e.g., the generated test and its corresponding human-provided test oracle) may be used to reject the potential repair at the selected fault location as a proper repair (a patch) of the fault. For example, a potential repair may pass a first augmented test with a first human-provided test oracle and fail a second augmented test with a second human-provided test oracle. In his example, if the potential repair is not tested against the second augmented test with the second human-provided test oracle, the potential repair may be incorrectly accepted as a proper repair even though it is not a proper repair (e.g., not a patch).

Otherwise, if the potential repair at the selected fault location does not pass the tests of the augmented test suite, decision block 320 may be followed by block 322 ("Reject Potential Repair"), where the repair module may reject the potential repair at the selected fault location as an improper repair. The repair module may discard the repair candidate that was the basis of the potential repair as generating an improper or incorrect repair. Block 322 may be followed by decision block 328, as will be further described below.

Otherwise, if at decision block 310 the repair module determines that there are no additional (e.g., a new) tests to augment the test suite, decision block 310 may be followed by block 324 ("Accept Potential Repair"), where the repair module may accept the potential repair at the selected fault location as a proper repair (a patch). The repair module may accept the repair candidate that was the basis of the potential repair as generating a proper or correct repair. The repair module may include the accepted potential repair as a proper repair (a patch) in patches 110. As indicated above, decision block 310 may also follow from decision block 320 in the instance where the repair module may be checking to determine whether there is another additional (e.g., another new) test to augment the augmented test suite.

Block 324 may be followed by decision block 326 (Generate More Repairs?"), where the repair module may determine whether it should attempt to generate additional potential repairs at the selected fault location. Subsequent to accepting a potential repair at the selected fault location as a patch, the repair module may determine whether it should attempt to generate an additional patch, other than the just accepted patch, at the selected fault location. For example, the repair module may attempt to generate multiple potential repairs at the selected fault location (e.g., multiple patches for a fault) as newly generated tests may invalidate previously accepted potential repairs (e.g., previous patches). In some embodiments, the repair module may be configured to not attempt to generate additional potential repairs at a selected fault location after expending a specific amount of computational effort. As one example of the specific amount of computational effort, the repair module may be configured to not spend more than n hours attempting to generate additional potential repairs at a selected fault location. As another example of the specific amount of computational effort, the repair module may be configured to not attempt to generate additional potential repairs at a selected fault location after generating m number of patches at the selected fault location. As still another example of the specific amount of computational effort, the repair module may be configured to not attempt to generate additional potential repairs at a selected fault location upon determining that the last p patches resulted in no new tests being generated. This may be an indication that the augmented test suite is sufficiently robust and/or unlikely to reject potential repairs or invalidate previous patches. The specific amount of computational effort may be any combination of two or more of the aforementioned examples. In some embodiments, values of n, m, and/or p may be set based on empirical data. In some embodiments, values of n, m, and/or p may be arbitrarily set.

If the repair module determines that it should attempt to generate additional potential repairs at the selected fault location, decision block 326 may be followed by decision block 328 ("More Repair Candidates?"), where the repair module may determine whether there is another (e.g., an additional) repair candidate that may be implement as another potential repair at the selected fault location. Decision block 328 may also follow from decision block 308 in the instance the potential repair at the selected fault location does not pass all the tests of the test suite. Decision block 328 may also follow from block 322 where the repair module rejects the potential repair at the selected fault location as an improper repair. If the repair module determines that there is an additional repair candidate that may be implement as another potential repair at the selected fault location, decision block 328 may be followed by block 304, where the repair module may implement an additional potential repair at the selected fault location using the additional repair candidate. The repair module may implement the additional repair candidate at the selected fault location as another potential repair of the fault corresponding to the fault location. The repair module may then test the additional potential repair as described herein. Otherwise, if the repair module determines that there are no additional repair candidates that may be implemented as another potential repair at the selected fault location, decision block 328 may be followed by decision block 330 ("More Fault Locations?"), where the repair module may determine whether there is another fault location in the software program that may be repaired. Decision block 330 may also follow from decision block 326 in the instance the repair module determines that it should not attempt to generate additional potential repairs at the selected fault location. If the repair module determines that there is another fault location in the software program that is being repaired, decision block 330 may be followed by block 302, where the repair module may select another (e.g., new) fault location in the software program that is being repaired for processing. For example, the repair module may select the next highest priority fault location as the new fault location. The repair module may then process the selected new fault location as the particular fault location (e.g., the new fault location replaces the current, particular fault location as the new particular fault location) as described herein.

Otherwise, if the repair module determines that there are no additional fault locations in the software program that is being repaired, decision block 330 may be followed by block 332 ("Output Patches"), where the repair module may output the patches (e.g., patches 110) generated during the repair of the software program. The output patches may include the patches to a single repair location. The output patches may include the patches to multiple repair locations The output patches may include one patch for each repair location. In some embodiments, the repair module may also output the augmented test suite including the newly generated test cases augmented with their corresponding human-provided test oracles (e.g., augmented test suites 108) generated during the repair of the software program. The augmented test suite may then be used to identify faults and corresponding fault locations in other software programs.

Those skilled in the art will appreciate that, for this and other processes and methods disclosed herein, the operations performed in the processes and methods may be implemented in differing order. Additionally or alternatively, two or more operations may be performed at the same time. Furthermore, the outlined actions and operations are only provided as examples, and some of the actions and operations may be optional, combined into fewer actions and operations, or expanded into additional actions and operations without detracting from the essence of the disclosed embodiments.

In addition, in some embodiments, the operations performed in the processes and methods may be performed iteratively in which a single fault location and/or repair candidate may be analyzed at a time. Additionally or alternatively, one or more operations associated with one or more blocks may be performed with respect to multiple fault locations and/or repair candidates at a time.

For example, as an example interactive repair process, the repair module may be interactively repairing a software program, and may be processing the following fault in the following software program:

```
int median(int n1, int n2, int n3) {
//n1 is the median
if (n2<=n1 && n1<=n3)
   return n1;
//n2 is the median
if ((n1<n2 && n2<=n3)||(n3<=n2 && n2<n1))
   return n2;
//Otherwise n3 is the median
   return n3;
}
```

The above faulty software program includes a function that returns a median of three integers, which includes a fault (e.g., the fault is the statement "if (n2<=n1 && n1<=n3) return n1"). The fault and the corresponding fault location (e.g., the above fault location) may have been identified using the test suite below:

```
void test1( ) {
// Test 3 different numbers
assert (median(2, 6, 8) 6);
}
void test2( ) {
// Test 3 different numbers
assert (median(9, 9, 9) 9);
}
void test3( ) {
// Test 3 different numbers
assert (median(8, 8, 2)==8);
}
```
For example, applying the above test suite, the function returns the value "2" in response to the test "median(8, 8, 2)" instead of the value "8" and fails the assertion "assert (median(8, 8, 2)==8)".

The repair module may attempt to repair or fix the fault by implementing the following potential repair [1]:
replace $$\text{if } ((n1<n2 \ \&\& \ n2<=n3)||(n3<=n2 \ \&\& \ n2<n1))$$

return n2;
with $$\text{if } ((n1<n2 \ \&\& \ n2<=n3)||(n^1==n^2)) \tag{1}$$

return n2;
The repair module may test the function including the potential repair [1] against the test suite. The function with the potential repair [1] passes the three tests of the test suite. Rather than accepting the potential repair [1] as a proper repair, the repair module may attempt to generate an additional test to further test the potential repair [1].

For example, the repair module may generate a first additional test, "median(8, 6, 2)" (e.g. a test that permutes the arguments in the first test), to test the potential repair [1]. The repair module may generate a query, "What is the median of the three numbers 8, 6, and 2?" based on the first additional test. The repair module may present the query to a human, and the human may provide a response, "the number 6." The repair module may then generate a human-provided test oracle "assert(median(8, 6, 2) 6)" based on the query associated with the first additional test and the response of the human, and include a first human-provided test oracle with the first additional test to augment the first additional test as a fourth test in the test suite as follows:

```
    void test1( ) {
    // Test 3 different numbers
    assert (median(2, 6, 8) 6);
    }
    void test2( ) {
    // Test 3 different numbers
    assert (median(9, 9, 9) 9);
    }
    void test3( ) {
    // Test 3 different numbers
    assert (median(8, 8, 2)==8);
    }
    void test4( ) {
    // Test with test1 args permuted
    assert(median(8, 6, 2)==6);
    }
```

That is, the repair module may generate an augmented test suite based on the tests of the test suite and the augmented first test (e.g., the fourth test) that includes the first human-provided test oracle. The repair module may then test the function with the potential repair [1] against the augmented test suite (e.g., against the original three test cases as well as the newly generated fourth test with its human-provided test oracle). Tested against the augmented test suite, the function (e.g., the potential repair [1]) returns the value "2" in response to the first additional test "median(8, 6, 2)" instead of the value "6" and fails the first human-provided test oracle "assert (median(8, 6, 2) 6)". As a result of the function failing the augmented test suite, the repair module may discard the potential repair [1] as an improper repair.

The repair module may again attempt to repair or fix the fault by implementing the following potential repair [2]:
replace $$\text{if } (n2<=n1 \ \&\& \ n1<=n3)$$

return n1;
with $$\text{if } ((n2<=n1 \ \&\& \ n1<=n3)||(n^1==n^2)) \tag{2}$$

return n1;
The repair module may test the function including the potential repair [2] against the augmented test suite including the first augmented test with its human-provided test oracle. The function with the potential repair [2] passes the four tests of the augmented test suite. Rather than accepting the potential repair [2] as a proper repair, the repair module may attempt to generate another additional test to further test the potential repair [2].

For example, the repair module may generate a second additional test, "median(6, 8, 2)" (e.g. a test that further permutes the arguments in the first test), to test the potential repair [2]. The repair module may generate a query, "What is the median of the three numbers 6, 8, and 2?" based on the second additional test. The repair module may present the query to a human, and the human may provide a response, "the number 6." The repair module may then generate a second human-provided test oracle "assert(median(6, 8, 2) 6)" based on the query associated with the second additional test and the response of the human, and include the second human-provided test oracle with the second additional test to augment the second additional test as a fifth test that may be included in the augmented test suite as follows:

```
    void test1( ) {
    // Test 3 different numbers
    assert (median(2, 6, 8) 6);
    }
    void test2( ) {
    // Test 3 different numbers
    assert (median(9, 9, 9) 9);
    }
    void test3( ) {
    // Test 3 different numbers
    assert (median(8, 8, 2)==8);
    }
    void test4( ) {
    // Test with test1 args permuted
    assert(median(8, 6, 2) 6);
    }
    void test5( ) {
    // Test with test1 args permuted
    assert(median(6, 8, 2)==6);
    }
```
The repair module may then test the function with the potential repair [2] against the augmented test suite (e.g., including the fifth test in addition to the previously present four tests). Tested against the augmented test suite, the function (e.g., the potential repair [2]) returns the value "2" in response to the second additional test "median(6, 8, 2)" instead of the value "6" and fails the second human-provided test oracle "assert (median(6, 8, 2) 6)". As a result of the function failing the augmented test suite, the repair module may discard the potential repair [2] as an improper repair.

The repair module may again attempt to repair or fix the fault by implementing the following potential repair [3]: replace if (n2<=n1 && n1<=n3)

return n1;
with if ((n2<=n1 && n1<=n3)||(n3<=n1 && n1<=n2))  [3]

return n1;
The repair module may test the function including the potential repair [3] against the augmented test suite including the second additional test with the second human-provided test oracle (e.g., the fifth test). The function with the potential repair [3] passes the five tests of the augmented test suite. The repair module may then determine that additional tests are not required to further test the function with the potential repair [3]. For example, the repair module may determine that the augmented test suite is sufficiently robust. Accordingly, the repair module may accept the potential repair [3] as a proper repair (patch) at the fault location.

Figure 4:
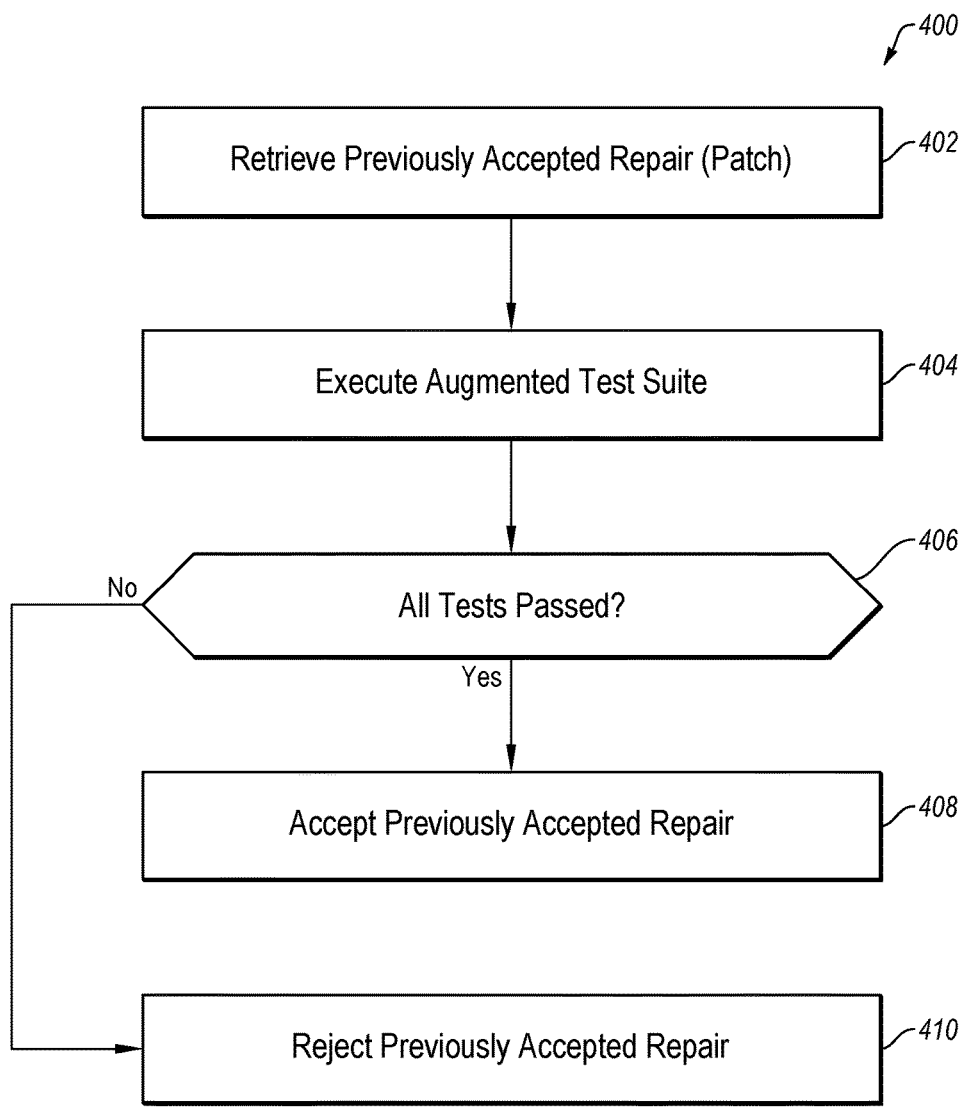
FIG. 4 is a flow diagram that illustrates an example process to retest previously accepted repairs using an augmented test suite, all arranged in accordance with at least some embodiments described herein.

FIG. 4 is a flow diagram 400 that illustrates an example process to retest previously accepted repairs using an augmented test suite, arranged in accordance with at least some embodiments described herein. Example processes and methods may include one or more operations, functions or actions as illustrated by one or more of blocks 402, 404, 406, 408, and/or 410. The operations described in blocks 402-410 may be performed by any suitable system, apparatus, or device with respect to a software program (e.g., code under test 104 of FIG. 1). For example, in some embodiments, the operations described in blocks 402-410 may be performed by repair module 106 of FIG. 1 or a computing system such as computing system 202 of FIG. 2 (e.g., as directed by a repair module). The operations described in blocks 402-410 may also be stored as computer-executable instructions in a computer-readable medium such as memory 252 and/or data storage 254 of computing system 202.

As depicted by flow diagram 400, the example process to retest previously accepted repairs using an augmented test suite may begin with block 402 ("Retrieve Previously Accepted Repair (Patch)"), where a repair module (e.g., repair module 106 of FIG. 1) may retrieve a previously accepted repair (e.g., previously accepted potential repair at a fault location) to test against an augmented test suite. The augmented test suite may include one or more tests (e.g., human-provided test oracles), and the previously accepted repair may not have been tested against one or more of the tests in the augmented test suite.

Block 402 may be followed by block 404 ("Execute Augmented Test Suite"), where the repair module may test the retrieved previously accepted repair against the augmented test suite. The repair module may test the previously accepted repair against the augmented test suite to determine whether the previously accepted repair is still a proper repair (patch).

Block 404 may be followed by decision block 406 ("All Tests Passed?"), where the repair module may determine whether the previously accepted repair passes the tests of the augmented test suite. If the repair module determines that the previously accepted repair passes the tests of the augmented test suite, decision block 406 may be followed by block 408 ("Accept Previously Accepted Repair"), where the repair module may accept (e.g., again accept) the preciously accepted repair as a proper repair.

Otherwise, if the repair module determines that the previously accepted repair does not pass the tests of the augmented test suite, decision block 406 may be followed by block 410 ("Reject Previously Accepted Repair"), where the repair module may reject the previously accepted repair as an improper or incorrect repair. That is, the repair module may prune the previously accepted repair as no longer being a proper repair. The previously accepted repair is rejected and is no longer a proper repair for failing the augmented test suite. In some embodiments, the repair module may remove the previously accepted repair from patches 110. The repair module may test additional previously accepted repairs that have not been tested against the augmented test suite against the augmented test suite.

As indicated above, the embodiments described in the present disclosure may include the use of a special purpose or general purpose computer (e.g., processor 250 of FIG. 2) including various computer hardware or software modules, as discussed in greater detail herein. Further, as indicated above, embodiments described in the present disclosure may be implemented using computer-readable media (e.g., memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method to interactively repair a software program, the method comprising:
   identifying a fault location in a software program in which the fault location includes a fault of the software program;
   generating a potential repair at the fault location based on a repair candidate that modifies the software program at the fault location;
   automatically generating a first test to test efficacy of the potential repair with respect to correction of the fault;
   generating a first query that relates to an expected result of the first test in which obtaining the expected result of the first test in response to executing the first test indicates that the fault has been corrected;
   obtaining a response to the first query from a human, the response including an indication of the expected result of the first test;
   generating an augmented first test by adding, as indicated by the response to the first query, the expected result of the first test with the first test as a test oracle to the first test;
   augmenting a test suite to include the augmented first test;
   testing the efficacy of the potential repair with respect to correction of the fault using the augmented test suite by determining whether the expected result of the augmented first test is obtained from execution of the potential repair; and
   in response to a passing result of the augmented test suite accepting the potential repair as a proper repair of the fault.

2. The method of claim 1, further comprising:
   automatically generating a second test to test the efficacy of the potential repair with respect to correction of the fault;
   generating a second query that relates to an expected result of the second test in which obtaining the expected result of the second test in response to executing the second test indicates that the fault has been corrected;
   obtaining a response to the second query from a human, the response including an indication of the expected result of the second test;
   generating an augmented second test by adding, as indicated by the response to the second query, the expected result of the second test with the second test as a second test oracle to the second test; and
   augmenting the augmented test suite to include the second augmented test.

3. The method of claim 2, further comprising testing the efficacy of the potential repair with respect to correction of the fault using the augmented test suite including the second augmented test by determining whether the expected result of the augmented second test is obtained from execution of the potential repair.

4. The method of claim 3, further comprising accepting the potential repair as a proper repair in response to the potential repair passing the augmented test suite including the augmented second test.

5. The method of claim 3, further comprising rejecting the potential repair as an improper repair in response to the potential repair not passing the augmented test suite including the augmented second test.

6. A method to interactively generate repairs to a software program, the method comprising:
   automatically generating a test to test efficacy of a first potential repair with respect to correction of a fault of a software program, wherein the potential repair modifies a software program at a fault location, the fault location including the fault in the software program, the first potential repair being based on a first repair candidate;
   generating a query that relates to an expected result of the test in which obtaining the expected result in response to executing the test indicates that the fault has been corrected;
   obtaining a response to the query from a human, the response including an indication of the expected result of the test;
   generating an augmented test by adding, as indicated by the response to the query, the expected result with the test as a test oracle to the test;
   augmenting a test suite to include the augmented test; and
   testing the efficacy of the first potential repair with respect to correction of the fault using the augmented test suite including the augmented test by determining whether the expected result of the augmented test is obtained from execution of the potential repair.

7. The method of claim 6, further comprising, responsive to the first potential repair passing the augmented test suite including the augmented test, accepting the first potential repair as a first proper repair.

8. The method of claim 7, further comprising:
   generating a second potential repair at the fault location in the software program, the second potential repair being based on a second repair candidate that modifies the software program at the fault location;
   testing efficacy of the second potential repair with respect to correction of the fault using the augmented test suite including the augmented test by determining whether the expected result of the augmented test is obtained from execution of the second potential repair; and
   accepting the second potential repair as a second proper repair responsive to the second potential repair passing the augmented test suite including the augmented test.

9. The method of claim 6, further comprising testing a previously accepted potential repair using the augmented test suite including the augmented test.

10. A system configured to interactively repair a software program, the system comprising:

one or more non-transitory computer-readable storage media configured to store instructions; and one or more processors configured to execute the instructions, wherein execution of the instructions causes the system to perform operations comprising:

identify a fault location in a software program in which the fault location includes a fault of the software program;

generate a first potential repair at the fault location based on a first repair candidate that modifies the software program at the fault location;

generate a first test to test efficacy of the first potential repair with respect to correction of the fault;

generate a first query that relates to an expected result of the first test in which obtaining the expected result of the first test in response to executing the first test indicates that the fault has been corrected;

obtain a response to the first query from a human, the response including an indication of the expected result of the first test;

generate an augmented first test by adding, as indicated by the response to the first query, the expected result of the first test with the first test as a test oracle to the first test;

augment a test suite to include the augmented first test; and test the efficacy of the first potential repair with respect to correction of the fault using the augmented test suite including the augmented first test by determining whether the expected result of the augmented first test is obtained from execution of the first potential repair.

11. The system of claim 10, wherein the operations further comprise accept the first potential repair as a first proper repair in response to the first potential repair passing the augmented test suite including the augmented first test.

12. The system of claim 10, wherein the operations further comprise reject the first potential repair as an improper repair in response to the first potential repair not passing the augmented test suite including the augmented first test.

13. The system of claim 10, wherein the operations further comprise, responsive to the first potential repair passing the augmented test suite including the augmented first test:

generate a second test to test the efficacy of the first potential repair with respect to correction of the fault;

generate a second query that relates to an expected result of the second test in which obtaining the expected result of the second test in response to executing the first test indicates that the fault has been corrected;

obtain a response to the second query from a human, the response including an indication of the expected result of the second test;

generating an augmented second test by adding, as indicated by the response to the first query, the expected result of the second test with the second test as a test oracle to the second test; and augment the augmented test suite to include the augmented second test.

14. The system of claim 13, wherein the operations further comprise test the efficacy of the first potential repair with respect to correction of the fault using the augmented test suite including the augmented second test by determining whether the expected result of the augmented second test is obtained from execution of the first potential repair.

15. The system of claim 10, wherein the operations further comprise:

generate a second potential repair at the fault location based on a second repair candidate that modifies the software program at the fault location;

test efficacy of the second potential repair with respect to correction of the fault using the augmented test suite including the augmented first test by determining whether the expected result of the augmented first test is obtained from execution of the potential repair; and accepting the second potential repair as a second proper repair responsive to the second potential repair passing the augmented test suite including the augmented first test.

16. The system of claim 15, wherein the operations further comprise accept the second potential repair as a second proper repair responsive to the second potential repair passing the augmented test suite including the augmented first test.

17. The system of claim 10, wherein the operations further comprise test a previously accepted potential repair using the augmented test suite including the augmented first test.

* * * * *